July 19, 1966  M. R. RIEK  3,262,005
HIGH INTENSITY CARBON ELECTRODE
Filed Aug. 26, 1963
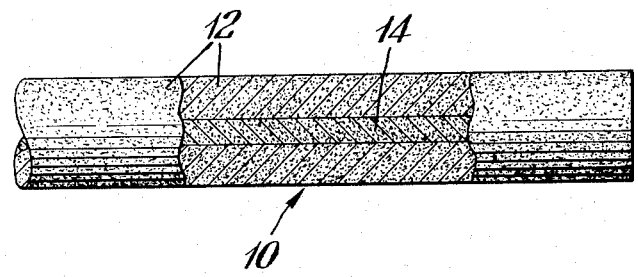
INVENTOR
MARVIN R. RIEK
BY
ATTORNEY

3,262,005
HIGH INTENSITY CARBON ELECTRODE
Marvin R. Riek, Fostoria, Ohio, assignor to Union Carbide Corporation, a corporation of New York
Filed Aug. 26, 1963, Ser. No. 304,637
7 Claims. (Cl. 313—311)

The invention relates to a high intensity arc carbon electrode for use in arc lighting, motion picture projectors, solar simulation, and the like, and to means by which the power rating of such an electrode can be improved.

High intensity arcs are usually developed between a negative carbon electrode and a positive carbon electrode which comprises a shell and a core therein containing a substantial amount of flame material which becomes highly luminescent under the action of electrons in the arc. The current density in the high intensity positive carbon is frequently as high as 1500 amperes per square inch and above, and at such a high current density the core material is vaporized more rapidly than that of the shell until a deep cup-like crater is formed in the working face. The electrode vapors of carbon and flame materials in the crater are heated to a very high temperature and radiating efficiency, and produce a brightness several times that possible with a solid carbon electrode or an electrode without flame material, such as that used for the negative.

Although high intensity arc carbons are operated at high current densities, there is a maximum current density beyond which the arc becomes unsteady. For example, a standard 11 millimeter high intensity positive arc electrode begins to squeal and pop at about 200 to 210 amperes. This effect is undesirable since operation at higher currents provides a greater total light output from the arc. The maximum power at which the arc carbon can operate at a reasonably steady condition is referred to as its power rating.

The main object of the invention is to provide a means by which the power rating of a high intensity arc carbon electrode can be improved. Another object is to provide an arc carbon electrode having improved power characteristics.

The invention by means of which this and other related objects are achieved will be described with reference to the accompanying drawing wherein the sole figure is an illustration of an electrode typical of the electrode of the invention.

Broadly, the objects are achieved by the incorporation of at least one oxide of the metals zirconium and titanium in the shell of a high intensity arc carbon electrode in an amount sufficient to improve the power rating of the electrode. Ordinarily, between about 0.1% and about 6% oxide incorporated in the shell is preferred. If titanium oxide is employed, however, between about 0.1% and 3% oxide provides the most satisfactory results in electrodes for general use. The percentages are computed as metal dioxide based on the weight of the shell before incorporation of the oxide.

The oxide may be a simple oxide of zirconium or titanium, or it may be in the form of an alkaline earth metal salt, such as the barium, calcium, and magnesium titanates. If such salts are used to incorporate the oxide in the shell, the percentage by weight must be calculated as if the simple oxide were incorporated. Alkali metal salts could also be employed except that alkali metals cause shell flashing, and their presence is therefore in general undesirable.

Referring to the drawing, a high intensity arc carbon electrode 10 comprises an outer shell 12 and an inner core 14. The shell 12 has incorporated therein at least one oxide of the metals zirconium and titanium in an amount between 0.1% and 6% oxide. The core 14 may typically be composed of a predominant amount of carbonaceous material and flame material as will hereinafter be further described.

The arc carbon electrode may be made in accordance with the invention by first mixing the oxide with the mix composition of the shell, extruding the mix into the form of a shell, and then baking the shell in accordance with conventional procedures. Standard procedures may also be used to make the core for the shell. Such cores usually contain a predominant amount of carbonaceous material and flame material. The flame material is preferably oxides or fluorides of the rare earth metals, but may also be materials such as thorium, iron, nickel, cobalt, manganese, and vanadium. Compounds other than oxides and fluorides of the rare earth metals may also be employed, and such techniques are known in the art. The cores are easily made by extruding the core mix, baking the mix, and then inserting the baked core with a suitable binder thereround into the baked shell to form the final high intensity arc carbon anode.

Arc carbons made in accordance with the invention have as much as twice the power rating of an electrode consisting of the same ingredients but without the oxide of zirconium or titanium. For example, a standard 11 millimeter high intensity arc carbon was made according to conventional practice and then tested to determine its power rating. The standard electrode had a maximum operating current of 200 amperes at from about 70 to 80 volts. If the electrode is operated above 200 amperes, it will begin to overload and exhibit an unsteady arc. Several other carbon electrodes of the same type and size but with varying percentages of titanium dioxide in the shell were compared with the standard electrode. The results are shown in Table I below:

TABLE I.—ELECTRODES OF INVENTION COMPARED WITH PRIOR ART ELECTRODES

| Carbon | Maximum Current, amperes | Crater Depth, Inches | Arc Voltage |
| --- | --- | --- | --- |
| Standard 11 mm. High Intensity Arc Carbon | 200–210 | 0.308 | 74–76 |
| 11 mm. High Intensity Arc Carbon—½% $TiO_2$ in shell | 260 | 0.190 | 73–75 |
| 11 mm. High Intensity Arc Carbon—1% $TiO_2$ in shell | 400 | 0.177 | 72–74 |
| 11 mm. High Intensity Arc Carbon—2% $TiO_2$ in shell | (¹) | 0.100 | 71–74 |

¹ Not overloaded at 500 amperes.

The results in Table I show that a 2% addition of titanium dioxide in the shell of an 11 millimeter high intensity arc carbon increases the power rating of the electrode more than 250 percent. A further advantage obtained by the incorporation of the oxide in the shell is that the depth of the crater formed in the work face of the electrode during operation is decreased. This is advantageous since the shallower crater permits the luminescent gas ball, the area of highest light intensity, to increase in size and illuminate a much larger area. Thus, the total light output is increased by the larger exposed area of the gas ball. The above effects, however, cannot be obtained by incorporating the oxide in the core of the arc carbon.

The addition of titanium dioxide to the shell of the arc carbon also permits the reduction in the size of the core for an electrode of a given power rating. A reduction in core size is advantageous since the thickness of the shell wall can then be increased without increasing the overall diameter of the arc carbon. The thicker shell wall permits threaded joints to be made in the shell for joining electrodes end-to-end for the purpose of continuous operation. For example, a 16 millimeter standard high intensity positive electrode has a shell too thin to permit threaded joints. The inclusion of ½% titanium dioxide in the shell, however, permits a reduction of the core size from 0.475 inch to 0.445 inch while maintaining a given power rating. This reduction in core size and subsequent increase in shell wall thickness from 0.077 inch to 0.093 inch permits threaded joints to be machined in the shell wall, and also makes extrusion of the shells appreciably easier while maintaining standard amperage for a 16 millimeter arc carbon of 400 amperes.

What is claimed is:

1. A high intensity arc carbon positive electrode comprising a core and a shell, said shell containing between 0.1 and 6 percent by weight of at least one oxide of the metals zirconium and titanium, said percent by weight being computed as metal dioxide based on the weight of said shell without said oxide.

2. A high intensity arc carbon positive electrode comprising a core consisting predominantly of a carbonaceous material and flame material, and a shell consisting predominantly of carbonaceous material and containing between 0.1 and 6% by weight of at least one oxide of the metals zirconium and titanium, said percent by weight being computed as metal dioxide based on the weight of said shell without said oxide.

3. The electrode defined in claim 2 wherein said oxide of a transition metal is titanium dioxide.

4. The electrode defined in claim 2 wherein said oxide of a transition metal is zirconium dioxide.

5. A high intensity arc carbon positive electrode comprising a core predominantly consisting of carbonaceous material and rare earth oxides and fluorides, and a shell predominantly consisting of carbonaceous material and containing between 0.1 and 6 percent by weight of at least one oxide of the metals zirconium and titanium, said percent by weight being computed as metal dioxide based on the weight of said shell without said oxide.

6. The electrode defined in claim 5 wherein said oxide of a transition metal is titanium dioxide.

7. The electrode defined in claim 5 wherein said oxide of a transition metal is zirconium dioxide.

References Cited by the Examiner

UNITED STATES PATENTS

| | | | |
|---|---|---|---|
| 1,084,629 | 1/1914 | Hansen | 252—507 X |
| 1,093,957 | 4/1914 | Weintraub | 252—507 |
| 1,138,674 | 5/1915 | Little et al. | 252—520 X |
| 1,158,997 | 11/1915 | Field | 252—507 |
| 1,189,265 | 7/1916 | Ladoff | 252—507 X |
| 1,311,133 | 7/1919 | Mott | 252—507 X |
| 2,140,881 | 12/1938 | Parisot | 313—354 |
| 2,507,195 | 5/1950 | Colbeck et al. | 252—507 X |

JOHN W. HUCKERT, *Primary Examiner.*

DAVID J. GALVIN, *Examiner.*

A. J. JAMES, *Assistant Examiner.*